United States Patent [19]

Bennett et al.

[11] Patent Number: 5,491,607
[45] Date of Patent: Feb. 13, 1996

[54] METHOD OF MODIFYING A DISK DRIVE FROM SERIAL TO PARALLEL OPERATION

[75] Inventors: Phillip P. Bennett, Portola Valley; Edwin E. Flores, San Bruno, both of Calif.

[73] Assignee: Abekas Video Systems, Inc., Redwood City, Calif.

[21] Appl. No.: 294,426

[22] Filed: Aug. 23, 1994

Related U.S. Application Data

[63] Continuation of Ser. No. 868,474, Apr. 14, 1992, abandoned.

[51] Int. Cl.⁶ .................................................. G11B 23/02
[52] U.S. Cl. ......................................................... 360/137
[58] Field of Search ........................ 360/27, 61, 97.01, 360/137, 97.02; 369/47, 59; 134/21; 15/339; D32/31

[56] References Cited

U.S. PATENT DOCUMENTS

| | | | |
|---|---|---|---|
| 4,896,311 | 1/1990 | Ishihara | 369/124 |
| 4,989,205 | 1/1991 | Dunphy, Jr. et al. | 360/902 |
| 5,095,396 | 3/1992 | Putnam et al. | 360/97.01 |
| 5,164,867 | 11/1992 | Hagiwara et al. | 360/98.01 |
| 5,245,486 | 9/1993 | Hachiya et al. | 360/97.01 |

OTHER PUBLICATIONS

Actual Disk Drive, title unknown, Part No. 807–11 (formerly Part No. 20–T004–00), manufactured (i.e., authored) by Priam Co., a division of Sequent, 2300 Central Expressway, Santa Clara, California 95054–4972, date unknown, page number information not applicable.

*Primary Examiner*—A. J. Heinz
*Assistant Examiner*—David D. Davis
*Attorney, Agent, or Firm*—Limbach & Limbach

[57] ABSTRACT

A disk drive that is the product of modifying a standard computer disk drive to read and write data in parallel with all of its transducer heads at once, rather than serially with only one head at a time. A method and apparatus are disclosed for protecting the disk drive's platters from damage and contamination while working on the interior of the disk drive case. The apparatus includes a hinged cover that replaces a conventional disk drive cover while work is being performed on circuitry within the disk drive case. The hinged cover seals off the platters and the inside of the disk drive case except for the circuitry being worked on.

6 Claims, 5 Drawing Sheets

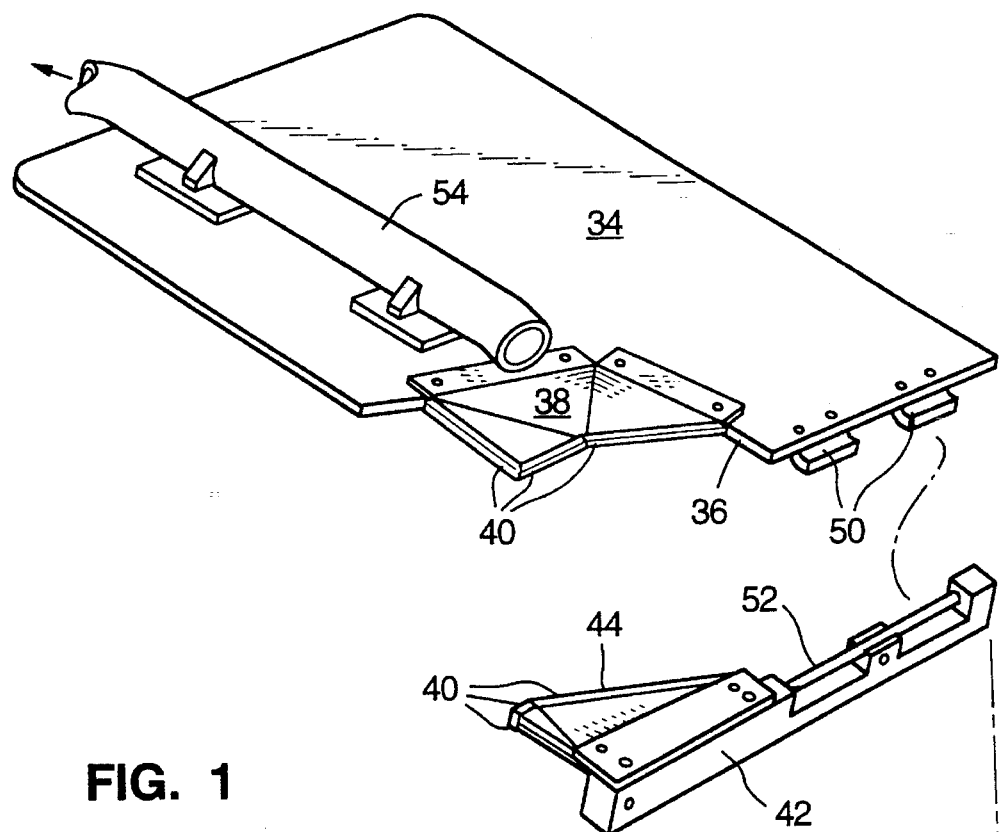
FIG. 1
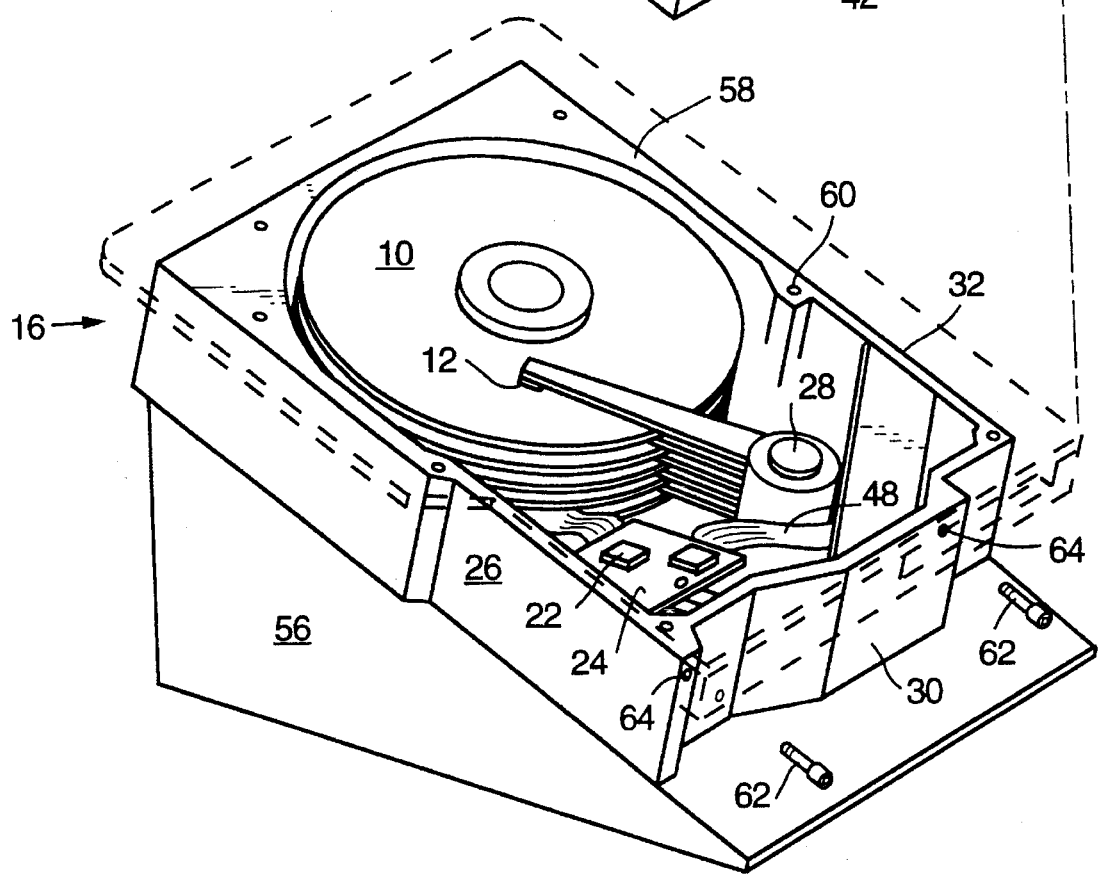

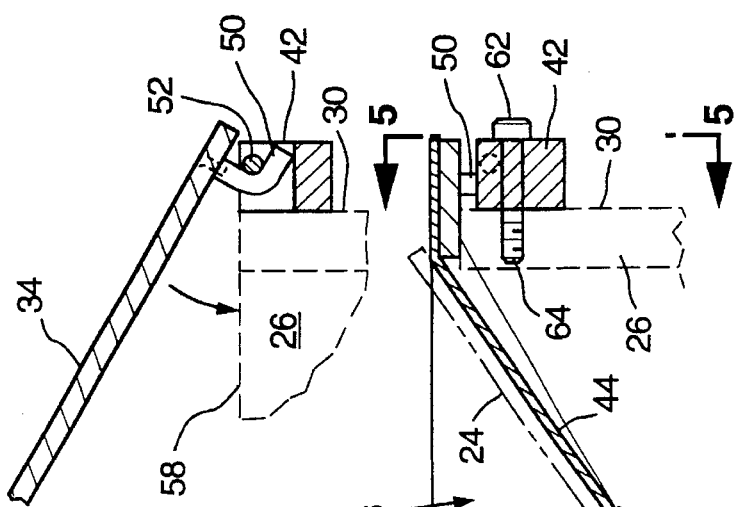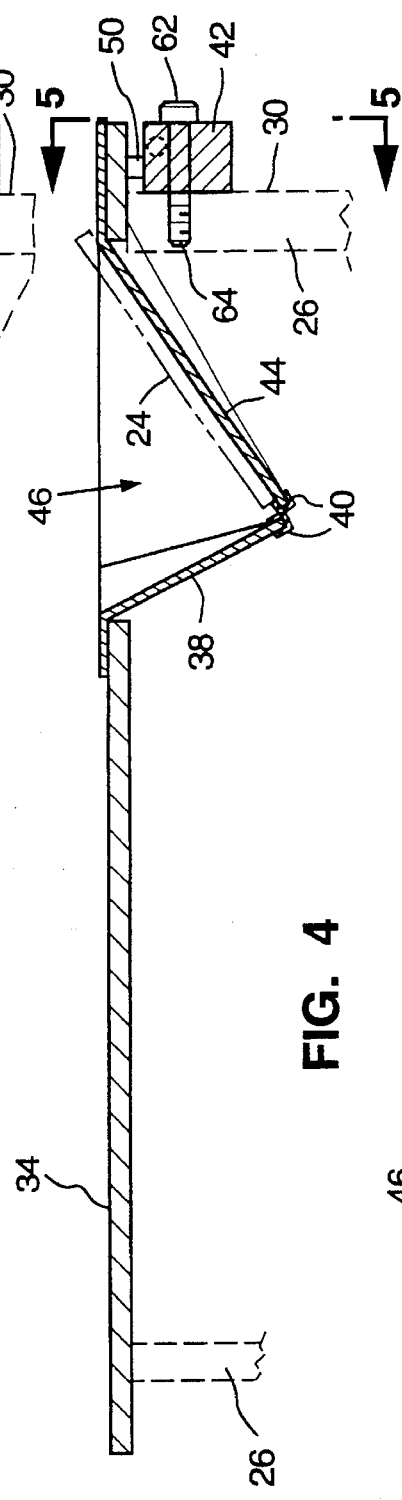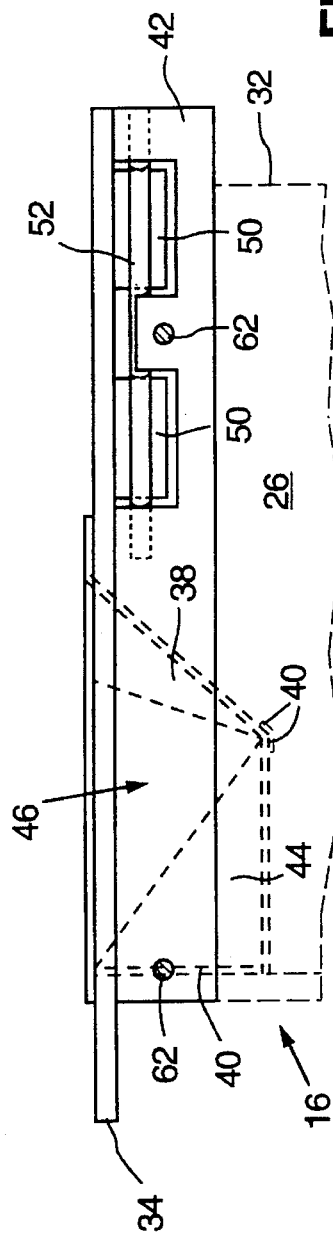

METHOD OF MODIFYING A DISK DRIVE FROM SERIAL TO PARALLEL OPERATION

This is a continuation of application Ser. No. 07/868,474 filed on Apr. 4, 1992 now abandoned.

BACKGROUND OF THE INVENTION

1. Field of the Invention

The present invention relates generally to computer disk drives, and more particularly, to an apparatus and method for use in modifying disk drives.

2. Description of the Related Art

Video image processing is currently a rapidly growing field in which vast quantities of data are processed in order to produce or manipulate video images. It is desirable to store and retrieve this data rapidly. Current magnetic disk drive technology readily lends itself to this task because of the small size, low cost, and availability of standard magnetic disk drives manufactured for personal computers and work stations.

Magnetic disk drives usually include one or more drive platters enclosed within a case. The surfaces of the drive platters are formed from a magnetic substance capable of storing digital data. Transducer heads extend over each platter for the purpose of transferring data to and from the platters. Typically, multiple transducers are moved in unison, by a single servo drive, over the surfaces of a rotating stack of platters. Electronics, often mounted on a printed circuit board on the interior of the case, coordinate the transfer of data from the transducer heads to digital systems located outside the case, and vice versa. However, conventional electronics transfer the data in a serial fashion, i.e., to only one transducer head at a time.

Magnetic disk drives operate best when the drive platters are kept extremely clean. Disk drive performance can be hindered when the drive platters become contaminated with minute particles of dust. In order to keep the drive platters clean, disk drives are assembled in a clean room and the covers of the disk drive cases are often hermetically sealed to the cases. Once a hermetically sealed case is opened, the drive platters can easily become contaminated, which often destroys the disk drive. Indeed, manufacturers of disk drives often warn consumers that any warranty covering the disk drive will become void if the hermetically sealed case is opened. The sensitive nature of drive platters has created a frustrating situation for those who perform work on the interior of disk drive cases.

Thus, it would be desirable to have a disk drive that could rapidly store and retrieve data for video image processing. For the reasons indicated above, it would also be desirable to achieve this goal by modifying existing standard disk drives to increase their storage and retrieval rates in a way such that work performed on the interior of the disk drive case would not contaminate the drive platters.

SUMMARY OF THE INVENTION

One aspect of the present invention provides for simultaneously utilizing all of the transducer heads in a standard disk drive such that they all read or write data to or from the disk drive platters at the same time.

Another aspect provides a method for converting a standard disk drive from serial operation (i.e., only one transducer head reading or writing at a time) to parallel operation.

Another aspect of the present invention is a method and apparatus for protecting the disk drive platters from damage and contamination while permitting access to electronic circuitry within a disk drive case.

A better understanding of the features and advantages of the present invention will be obtained be reference to the following detailed description of the invention and accompanying drawings which set forth an illustrative embodiment in which the principles of the invention are utilized.

BRIEF DESCRIPTION OF THE DRAWINGS

FIG. 1 is a partially exploded isometric view showing a disk drive with its cover removed and the elements of the invention used to protect the disk drive platters while its electronic circuitry is being worked on.

FIG. 3 is a partial side view taken in cross section along line 3—3 in FIG. 2.

FIG. 4 is a side view taken in cross section along line 4—4 in FIG. 2.

FIG. 5 is a partial end view of the disk drive and apparatus of FIG. 1.

DETAILED DESCRIPTION OF THE PREFERRED EMBODIMENT

Figure 1A:
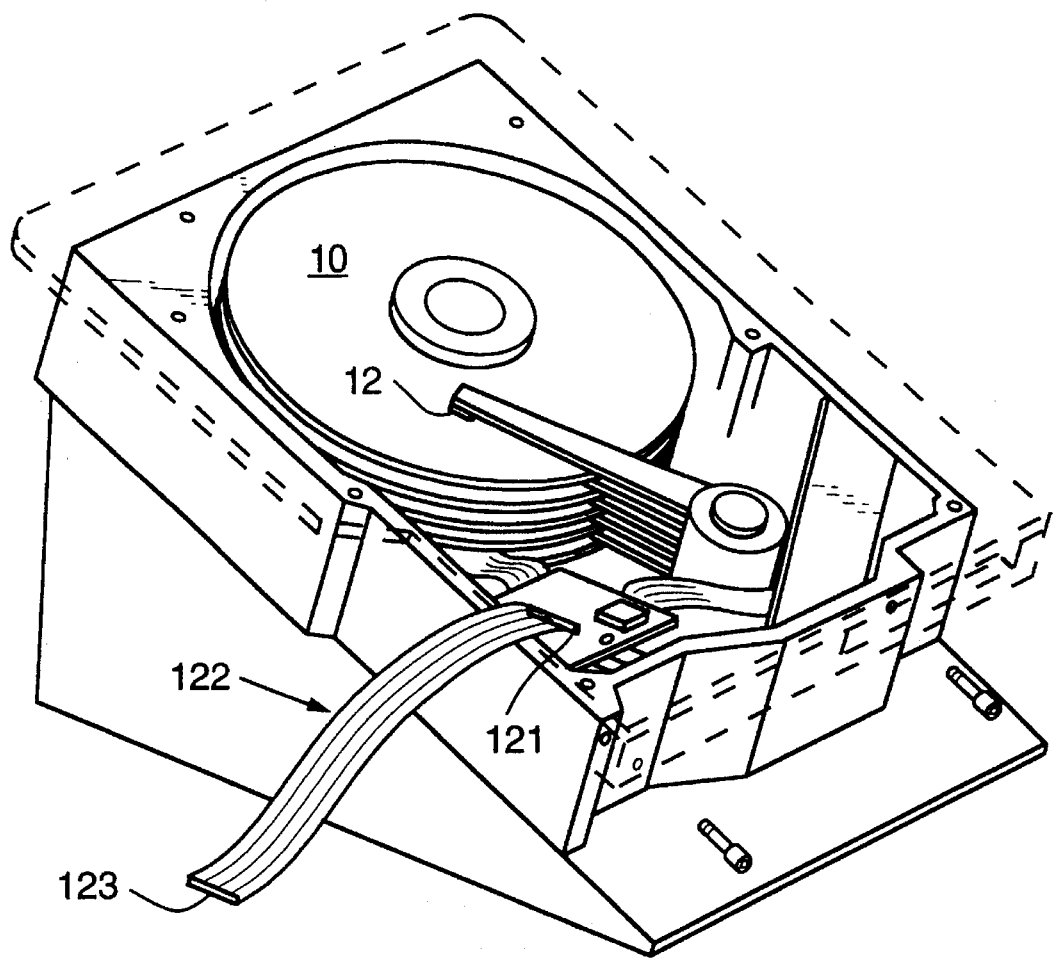
FIG. 1A is an isometric view of a modified disk drive in accordance with the present invention.
Figure 2:
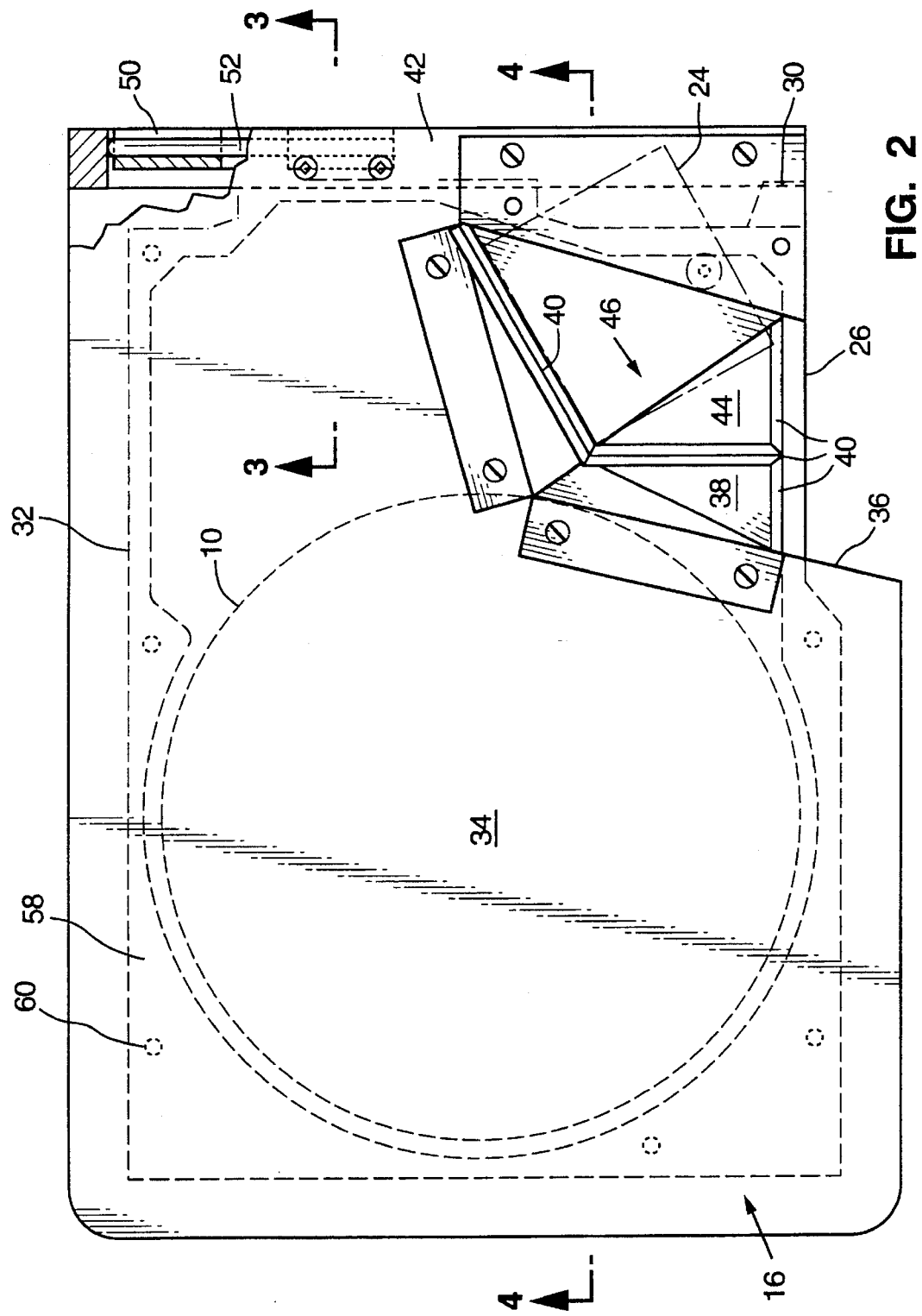
FIG. 2 is a partially broken away plan view showing the apparatus of FIG. 1.
Figure 6:
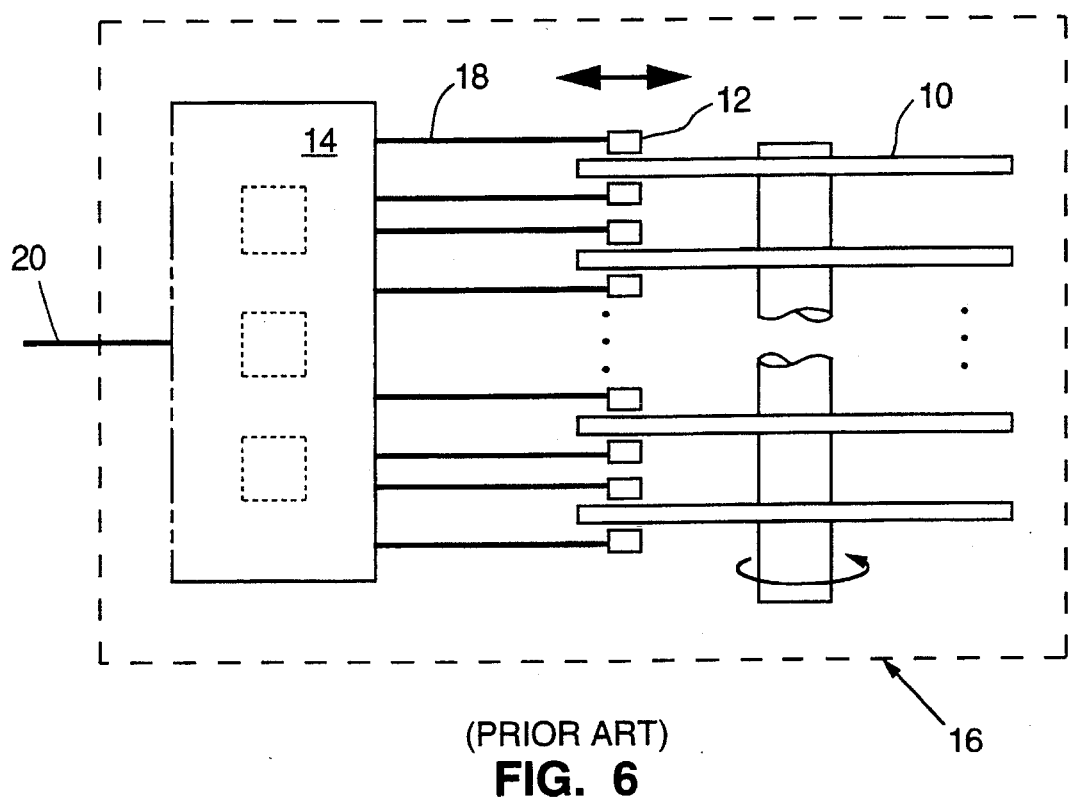
FIG. 6 is a schematic representation of the serial operation of a prior art disk drive.

FIG. 6 is a schematic representation of a rotating stack of platters 10, corresponding transducer heads 12 and transducer lines 18, and serial data directing circuitry 14 found in a typical prior art disk drive 16. Transducer heads 12 can magnetically store and retrieve electronic data to and from both the top and bottom surfaces of the platters 10, with each surface having a separate transducer head 12 associated with it. The transducer heads 12 are moved in unison by a servo drive (not shown) so that they may be selectively positioned radially along the platter 10 surfaces.

The transducer heads 12 are also known as read/write heads. In the "write" mode, the transducer heads 12 are moved over the surfaces of the rotating platters 10 while electronic data is supplied to one of the transducer heads 12 via a transducer line 18, and the data is magnetically recorded on a surface of one of the platters 10. In the "read" mode, the transducer head 12 is positioned over the rotating platter 10 where data was previously recorded, and the transducer head 12 senses the magnetic data on the platter 10 to electronically transmit the data back along the transducer line 18.

Prior art disk drives 16 include serial directing circuitry 14 for directing the electronic data from a signal line 20 to one of the transducer lines 18 and vice versa. The directing circuitry 14 may include switching circuits, data buffers, and amplifiers for boosting the strength of the data signals read from the platters 10. The directing circuitry 14 interfaces with the servo drive (not shown) and a platter rotational synchronization circuit (not shown) to coordinate the radial and angular positions on the platters 10 that the data is written to or read from.

When the prior art disk drive 16 is used in conjunction with equipment such as a personal computer, the computer sends and receives data to and from the disk drive 16 via the signal line 20. The directing circuitry 14 coordinates the flow of data between the signal line 20 and one transducer line 18 at a time.

Figure 7:
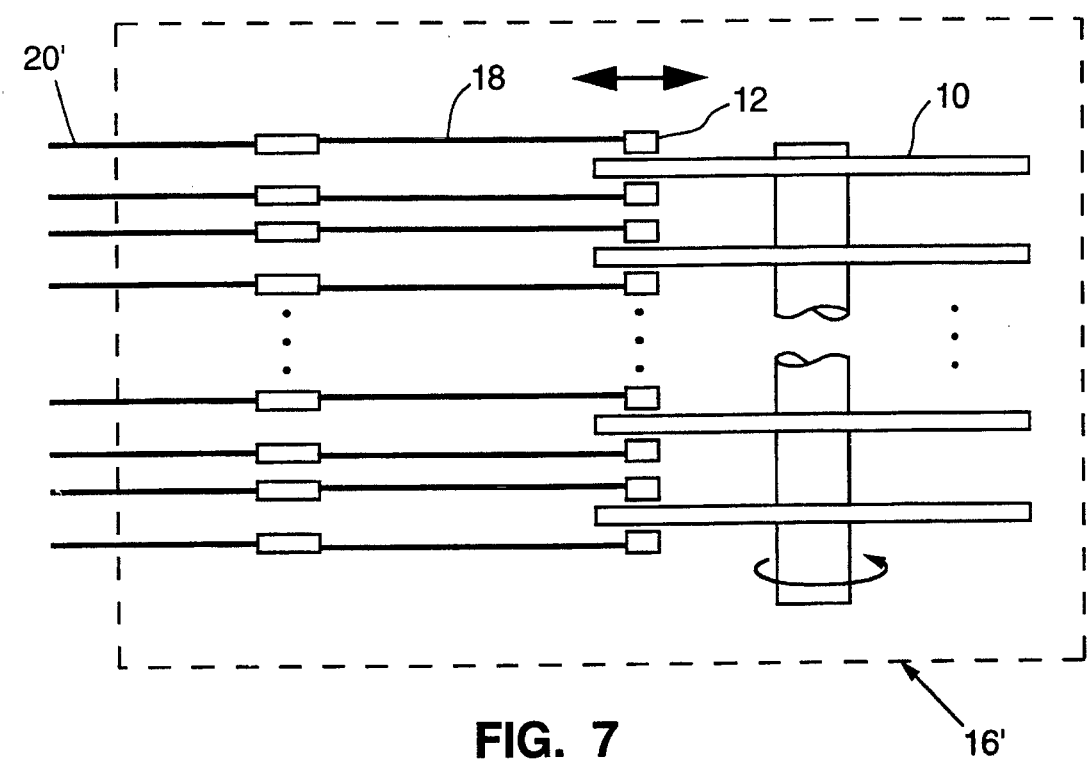
FIG. 7 is a schematic representation of the parallel operation of a modified disk drive according to the invention.

An advantage of the present invention over the prior art is the ability to utilize more than one transducer head 12 at a time. As shown in FIG. 7, and according to the present invention, the serial directing circuitry 14 is disabled, bypassed, or altogether removed and a separate signal line 20' is connected to each transducer line 18. A modified directing means (not shown) is connected to the signal lines 20' and allows all of the transducer heads 12 to read or write data simultaneously.

In the preferred embodiment, depicted in FIGS. 1 through 5, the serial to parallel modification is performed on a standard magnetic disk drive 16 having eight platters 10 and fifteen transducer heads 12, such as a WREN-6, model no. 94196, manufactured by Seagate Technology, Inc., Scotts Valley, Calif. To modify the conventional drive, each pre-amplifier integrated circuit (chip) 22 of the conventional drive is removed from circuitry 24 located inside hermetically sealed case 26 (typically, there are three pre-amplifier chips 22). Each chip 22 is replaced by the end 121 of a flex-connector 122 (shown in FIG. 1A) that is routed outside of the case 26 between the cover gasket (not shown) and the case 26. Each flex-connector has eleven conductors (in a preferred embodiment). The opposite end 123 of each flex-connector couples the flex-connector to the circuitry of video equipment (not shown). The flex-connectors are able to conduct signals between the fifteen transducer heads 12 and the new parallel directing circuits of the video equipment, thereby bypassing the serial directing circuitry 14 of the standard disk drive 16.

Although the data channels (transducer lines 18) are "broken out" from the disk drive 16, other circuitry such as the transducer head servo (radial position) control 28 and the spindle servo (platter rotation) control (not shown) remain intact and are accessed through the original connector (not shown) supplied on the disk drive 16. A spindle servo signal is also broken out of the disk drive 16 and supplied to the external data directing circuitry to synchronize the transfer of data with platter 10 rotation.

In a preferred embodiment, three flex-connectors 122 emerge from the rear 30 of the disk drive case 26. The disk drive 16 is manufactured with a circuit board (not shown) mounted on the rear face 30 of the case. To reduce electromagnetic interference to the three flex connectors, this circuit board is relocated to one side 32 of the case 26.

Another aspect of the invention, shown in FIGS. 1 through 5, involves the apparatus used to protect the platters 10 from contamination or damage when work is being performed on the inside of the disk drive case 26 (for example on circuitry 24 within case 26). A hinged cover 34 is provided to replace the conventional disk drive cover (not shown) once the conventional cover has been removed. The hinged cover 34 shields the platters 10 and the inside of the disk drive case 26 except for a cutout portion 36 that exposes a portion of the inside of the case 26 to be worked on.

A flange 38 is attached to the edge of the cutout 36 and protrudes partially into the disk drive case 26. An elastomeric grommet edging 40 is provided along the lower and side edges of the flange 38. The grommet edging 40 on the side of the flange 38 forms a seal with the inside wall of the disk drive case 26 when the hinged cover 34 is lowered into place.

The hinged cover 34 is removably and pivotally attached to a stationary member 42. The stationary member 42 is attached first to the rear side 30 of the disk drive case 26 and also has a flange 44 that protrudes partially into the disk drive case 26. The flange 44 also has grommet edging 40 along its lower and side edges and forms a seal against the side of the case 26 and against the grommet edging 40 of the hinged cover flange 38.

The hinged cover 34 and the stationary member 42 act in cooperation to seal off and protect the platters 10 and other components inside of the disk drive case 26 while providing a well 46 to expose a circuit board, flex circuit or other internal circuitry 24 to be worked on. The flange 44 of the stationary member 42 serves to support the internal circuitry 24 while it is being worked on. This circuitry 24 may continue to be wired into the disk drive case 26 with the wires, flex circuits, or other conductors 48 passing through the seal made between the grommet edging 40 of the stationary member 42 and hinged cover 34.

Two L-shaped tabs 50 are attached to the hinged cover 34 and releasably engage a hinge pin 52 which is attached to the stationary member 42. This arrangement allows the hinged cover 34 in a vertical position to be connected to the stationary member 42 and to be rotated down over the opening of the disk drive case 26.

A vacuum hose 54 is attached to the top of the hinged cover 34 with the open end of the hose 54 positioned over the well 46 formed by the two flanges 38 and 44. The vacuum provided by the hose 54 removes particles or debris generated by work performed on circuitry 24 in the well 46.

In the preferred embodiment, the apparatus of the invention is assembled as follows. In a clean room, preferably on a bench with an exhaust hood, a disk drive 16 to be modified or repaired is attached to a conventional work stand 56 (shown in FIG. 1). The exterior of the drive 16 is vacuumed before the sealed cover (not shown) of the disk drive 16 is removed. The disk drive cover and its gasket are then vacuumed as well as the cover mounting surface 58, mounting holes 60 and the inside of the disk drive case 26. The internal circuitry 24 to be worked on containing chips 22, is loosened and partially lifted from the disk drive case 26. The flange 44 of the stationary member 42 is then placed beneath the internal circuitry 24 to be worked on as the stationary member 42 is attached to the disk drive case 26.

The stationary member 42 is held firmly in place by two fasteners 62 which thread into existing holes 64 in the back of the disk drive case 26. The hinged cover 34 is then attached to the stationary member 42 by inserting the L-shaped tabs 50 under the hinge pin 52. The hinged cover 34 is then pivoted down over the opening of the disk drive case 26 and is held there by its own weight and by its hinged connection with the stationary member 42.

The grommet edging 40 on the hinged cover 34 comes in contact with the conductors 48 of the internal circuitry 24 and with the grommet edging 40 on the stationary member 42. This isolates the internal circuitry 24 from the rest of the inside of the disk drive case 26. The internal circuitry 24 is supported from below by the flange 44 of the stationary member 42 and is further held in place by the conductors 48 of the internal circuitry 24 that are constrained between the grommet edging 40 of the two flanges 38 and 44. Low pressure within vacuum hose 54 removes particles from well 46 while the internal circuitry 24 is being worked on.

Modifications or repairs may now be made to circuitry 24 of disk drive 16 without the danger of contamination or damage to the platters 10 or other internal components. One such modification, as discussed above, is to replace pre-amp chips 22 with flex connectors exiting the disk drive case 26. This results in a modified drive 16' having multiple signal lines 20' into the disk drive case 26 enabling the disk drive 16' to read and write data to all of its transducer heads 12 in a parallel fashion.

After work has been completed on circuitry 24, the reverse of the above steps is performed. The hinged cover 34 is removed by rotating it upward into a vertical position and disengaging it from the hinge pin 52 of the stationary member 42. The stationary member 42 is then unfastened from the disk drive case 26. The internal circuitry 24 that was being worked on is reattached to the inside of the disk drive case 26 and the conventional disk drive cover (not shown) is replaced. Thorough vacuuming during reassembly ensures that the platters 10 will remain clean.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A method of modifying a disk drive, the disk drive having transducer heads that store and retrieve information to and from at least one platter located inside of a disk drive case having a removable cover which is hermetically sealed to the case, the method comprising the steps of:

removing the removable cover from the disk drive case;

securing a plate to the disk drive case, the plate having a shape conforming substantially to the shape of the removable cover for engaging with the disk drive case as a substitute for the removable cover, the plate having a cut-away section for exposing a portion of the interior of the disk drive case and a flange connected to the plate along the cut-away section which extends into the interior of the disk drive case, the plate being secured to the disk drive case by engaging a hinge pin that is attached to the disk drive case after the removable cover is removed;

vacuuming in the vicinity of the cut-away section of the plate to prevent contaminants from entering the interior of the disk drive case, the plate including a vacuum tube having an opening located adjacent the cut-away section in order to perform such vacuuming;

disconnecting circuitry used to direct the information to and from the transducer heads in a serial fashion;

connecting circuitry that enables the information to be directed to and from the transducer heads in a parallel fashion;

removing the plate from the disk drive case; and securing the removable cover to the disk drive case.

2. The method of claim 1, wherein the plate further comprises a hinge tab for engaging with the hinge pin to pivotally attach the plate to the disk drive case.

3. The method of claim 1, wherein the step of disconnecting circuitry comprises removing at least one integrated circuit from interior circuitry of the disk drive.

4. The method of claim 3, wherein the step of connecting circuitry comprises connecting a plurality of conductors to a location previously occupied by the disconnected integrated circuit.

5. The method of claim 1, further comprising the step of:
   placing the disk drive on a clean air flow bench before the removable cover is removed.

6. The method of claim 1, further comprising the step of:
   vacuuming connecting portions of the removable cover and the disk drive case before the removable cover is removed.

* * * * *